United States Patent Office.

GEORGE W. HATFIELD, OF DAYTON, OHIO.

Letters Patent No. 96,231, dated October 26, 1869.

IMPROVEMENT IN THE MANUFACTURE OF PUTTY.

The Schedule referred to in these Letters Patent and making part of the same.

*To all whom it may concern:*

Be it known that I, GEORGE W. HATFIELD, of Dayton, in the county of Montgomery, in the State of Ohio, have invented a new and useful Improvement in Compounding "Putty;" and I do hereby declare that the following is a full and exact description thereof.

My invention relates to an improvement in putty; and

It consists in substitution of ground soft limestone for the marble-dust employed by J. and W. H. Lucas, as set forth in their patent, dated the 28th day of August, 1866.

My improved putty is made as follows:

Take ninety pounds of pulverized soft limestone, ninety pounds of whiting, and twenty pounds of linseed-oil, and work together until thoroughly incorporated.

I am aware, that in the process described in said Letters Patent of said J. and W. H. Lucas, they use a compound of marble-dust and whiting, in equal proportions, mixed with linseed-oil in a proportion not defined, but stated to be sufficient to give to the compound proper consistency.

I have proved, however, that by substituting pulverized soft limestone for the marble-dust, I not only make a cheaper article by substituting a material found almost everywhere, for one that is scarce and requires, generally, to be transported long distances, but that limestone is a better article for the purpose than marble, as it requires less oil to incorporate it, thereby saving in the amount of the most costly ingredient entering into the composition of putty; and also because it may be worked in much less, say about two-thirds of the time, required for working putty made with marble-dust; and also that the product of manufacture is better, as it remains plastic longer, while in bulk, and yet hardens as quickly, when exposed to the air, after being used.

I have discovered these results after experimenting for nearly two years, with a desire to improve this commodity.

Having thus described my improvement,

What I claim, is—

As an article of manufacture, putty compounded from the ingredients named, and as set forth.

In testimony whereof, I have signed my name to this specification, in the presence of two subscribing witnesses.

GEORGE W. HATFIELD.

Witnesses:
THOS. D. MITCHELL,
GATES OBLINGER.